(12) United States Patent
Dhruv et al.

(10) Patent No.: US 8,158,076 B2
(45) Date of Patent: Apr. 17, 2012

(54) CONTINUOUS HOT FILL PROCESS

(75) Inventors: Ashok S. Dhruv, Englewood, CO (US); Rei-Young Amos Wu, Palatine, IL (US); Michael J. Mastio, Crystal Lake, IL (US)

(73) Assignee: Stokely-Van Camp, Inc., Chicago, IL (US)

( * ) Notice: Subject to any disclaimer, the term of this patent is extended or adjusted under 35 U.S.C. 154(b) by 824 days.

(21) Appl. No.: 12/187,931

(22) Filed: Aug. 7, 2008

(65) Prior Publication Data
US 2009/0038267 A1 Feb. 12, 2009

Related U.S. Application Data

(60) Provisional application No. 60/955,152, filed on Aug. 10, 2007.

(51) Int. Cl.
| A61L 2/08 | (2006.01) |
| A61L 2/00 | (2006.01) |
| B01F 15/06 | (2006.01) |
| B01F 11/00 | (2006.01) |
| A23L 2/00 | (2006.01) |
| F16K 49/00 | (2006.01) |
| A01J 11/00 | (2006.01) |
| F22B 1/02 | (2006.01) |
| B65B 1/20 | (2006.01) |
| B65D 5/62 | (2006.01) |

(52) U.S. Cl. .......... 422/292; 422/1; 422/26; 422/32; 422/41; 422/256; 422/285; 422/307; 137/334; 137/12.5; 137/571; 99/348; 99/425; 99/483; 99/484; 99/485; 122/31.1; 141/82; 221/150 HC; 221/150 A; 222/146.1; 222/190; 222/227; 366/144; 366/241

(58) Field of Classification Search ............... 422/1, 26, 422/32, 41, 256, 285, 292, 307; 137/334, 137/571, 12.5; 99/348, 452, 483–485; 122/31.1; 141/82; 221/150 HC, 150 A; 222/146.1, 222/190, 227; 366/144, 241
See application file for complete search history.

(56) References Cited

U.S. PATENT DOCUMENTS

| 2,709,149 A | * | 5/1955 | Dunmire | .............. 514/251 |
| 2,933,392 A | * | 4/1960 | Iacono et al. | .............. 426/73 |
| 6,557,319 B1 | * | 5/2003 | Nolfi, Jr. | .............. 53/127 |

* cited by examiner

*Primary Examiner* — Jill Warden
*Assistant Examiner* — Monzer Chorbaji
(74) *Attorney, Agent, or Firm* — Banner & Witcoff, Ltd.

(57) ABSTRACT

An apparatus comprising a chamber where a base concentrate common to at least a first flavored food product and a second flavored food product is formed, the first flavored food product having different flavoring than the second flavored food product, the base concentrate having a first temperature. The apparatus also comprises a process line that receives the base concentrate from the chamber, heated liquid from a heated liquid source, and flavoring from either a first flavor source or a second flavor source to form a mixture of base concentrate, heated liquid and flavoring. The mixture has a has second temperature sufficient to achieve a change in the mixture selected from the group consisting of microbial change, chemical change, biochemical change, and enzymatic change, and combinations thereof. A method is also disclosed for change over from forming a first flavored food product to forming a second flavored food product.

21 Claims, 3 Drawing Sheets

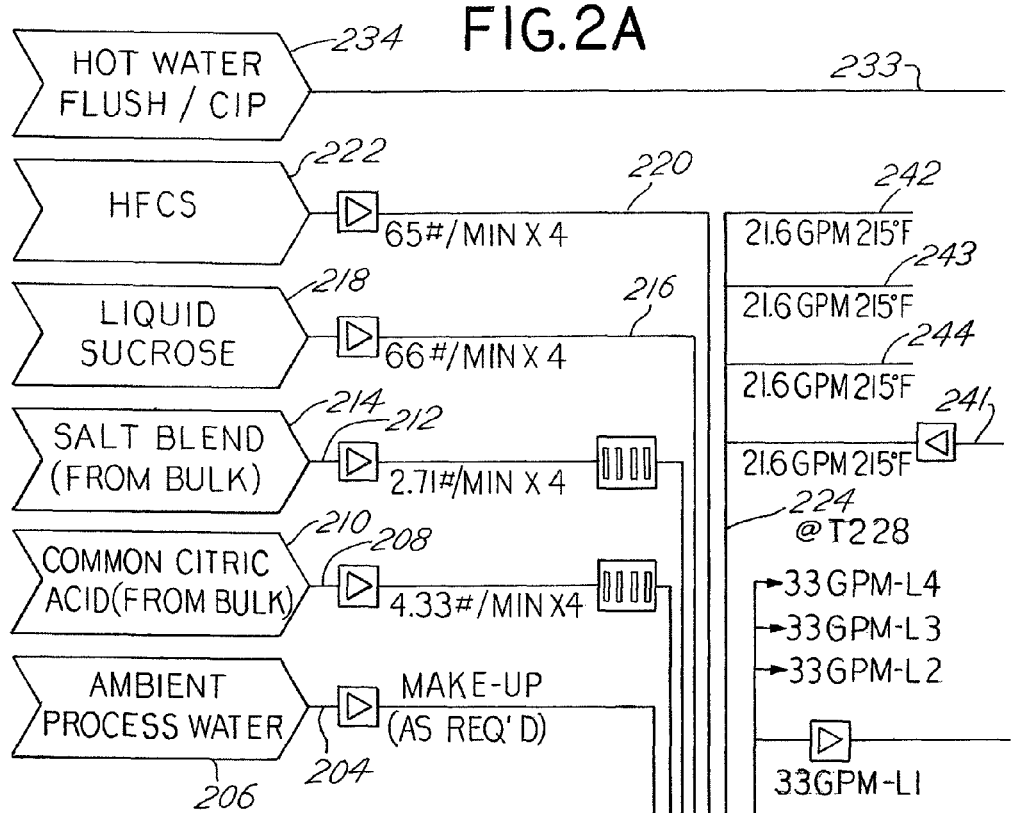
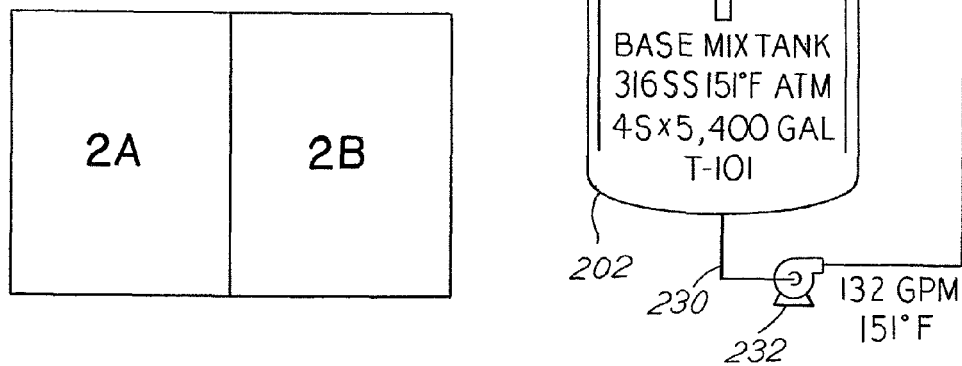

CONTINUOUS HOT FILL PROCESS

FIELD OF THE INVENTION

This invention relates to systems and methods for preparing heated products, e.g., beverages, wherein the heated products can then be placed into containers.

BACKGROUND

Beverages frequently need to be prepared and then heated to reduce microbial load and achieve desired shelf life. These beverages have to be further filled hot into containers (e.g., container made from polyethylene terephthalate (PET), or glass bottles and/or aluminum cans) and sealed so as to eliminate microbial contamination, again for a desired shelf life of the finished product-container combination. These containers can then be cooled down to below about 100° F. to reduce product degradation, to allow for application of labeling to the containers, and for extended storage during warehousing at the manufacturing facility, and for extended storage during shipping, warehousing at distributor and eventually at customer facilities and/or consumer homes prior to eventual consumption.

Conventional systems and methods typically employ large premix and even larger blending tanks to formulate a product. An example of a conventional system 10 is illustrated in FIG. 1. As shown in FIG. 1, a premix tank 12 having a capacity of about 800 gallons can be used for the mixing of dry ingredients from dry ingredient source 14 and water source 16. The resulting mixture 18 can be fed from premix tank 12 to a first blend tank 20 having a capacity of about 10,000 gallons via pump 19. In addition to mixture 18, additional ingredients can be fed to first blend tank 20. For example, water from water source 16, sucrose from sucrose source 22, and fructose from fructose source 24 can be fed to first blend tank 20. The same ingredients can also be fed to a second blend tank 26 having a capacity of about 10,000 gallons in parallel with first blend tank 20. The resulting mixture 28 of the first blend tank 20 and the resulting mixture 30 of the second blend tank 26 can be combined or individually inputted to a pump 32. Pump 32 can pump mixture 34 to balance tank 36 having a capacity of about 800 gallons. Stream 38 can exit balance tank 36 and be inputted to heater 40 via pump 42. At heater 40, stream 38 enters at a first temperature T1 (e.g. about 90° F.) and exits as stream 44 having a second temperature T2 (e.g. about 205° F.).

Stream 44 flows through hold product loop 46 for a period of time (e.g., about 30-33 seconds) to allow for the microbial load in stream 44 to be reduced at second temperature T2. Stream 44 can then enter trim cooler 48 at second temperature T2, and exit as stream 50 having a third temperature T3 (e.g., about 185° F.). Temperature T3 can be a suitable temperature which the container material can withstand without deformation or adverse impact when filled with stream 50. Stream 50 can be placed in filler supply tank 52 having a capacity of about 500 gallons. Stream 50 can exit filler supply tank 52 and be pumped by pump 54 to filler station 56, wherein it can be placed in containers 58.

As shown in FIG. 1, stream 50 can also be fed to filler return tank 60 having a capacity of about 500 gallons when it is desired to send stream 50 or a portion thereof to balance tank 36. Stream 50 can be pumped by pump 62 to divert cooler 64. Stream 50 can enter divert cooler 64 at temperature T3 and exit at temperature T4 (e.g., about 95° F.). Stream 50 can be cooled in divert cooler 64 by cold water stream 66 from cold water supply source 68. Cold water stream 66 can enter divert cooler 64 at temperature T5 (e.g., about 85° F.), and exit as stream 70 having a temperature T6 (e.g., about 125° F.). Stream 70 can then be sent to a cold water return 72. Cold water return 72 can comprise heat transfer apparatus (not shown) wherein stream 70 can be cooled until it reaches temperature T5. Cold water stream 66, stream 70, cold water return 72 and cold water supply source 68 can comprise a closed loop.

As shown in FIG. 1, hot water stream 74 from hot water supply source 76 can be fed to heater 40. Hot water stream 74 can enter heater 40 at temperature T7 (e.g., about 210° F.) and exit as stream 78 having temperature T8 that is lower than temperature T7. Stream 78 can be sent to hot water return 80. Hot water return 80 can comprise heat transfer apparatus (not shown) wherein stream 78 can be heated until it reaches temperature T7. Hot water stream 74, stream 78, hot water return 80 and hot water supply source 76 can comprise a closed loop.

As shown in FIG. 1, a second hot water supply source 82 can feed hot water stream 84 having a temperature T9 (e.g., about 210° F.) to heater 86. Hot water stream 84 can enter heater 86 at temperature T9, and exit as stream 88 at a temperature T10 that is lower than temperature T9. Stream 88 can be sent to hot water return 90. Hot water return 90 can comprise heat transfer apparatus (not shown) wherein stream 88 can be heated until it reaches temperature T9. Hot water stream 84, stream 88, hot water return 90 and hot water supply source 82 can comprise a closed loop.

As shown in FIG. 1, process water 92 from water source 16 can be fed to heater 86, wherein it is heated from a temperature T11 (e.g., ambient temperature) to a temperature T12 (e.g., 85-95° F.) that is higher than T11. Process water 92 can be sent to tanks 12, 20 and 26 as may be desired.

The conventional systems and methods require large blend tanks in order to keep an available supply of blend in the balance tank 36 for subsequent thermal treatment in the hold product loop 46. This conventional system has to be dedicated to a single flavor and hence each line can only make one flavor at a time. Typically, a plant may have 2 to 8 lines with each line producing single flavor each.

When it is desired to change the flavor of the product being treated in a conventional system, a large volume of product, starting from the batch blending to the filler discharge has to be emptied and flushed with hot water. This is followed by a new flavor product, which has to achieve a "thermal" steady state and the "water commingled stream" has to be discarded.

BRIEF SUMMARY OF THE INVENTION

The present invention provides a process that substantially reduces or eliminates the need for batch tanks and/or hold tube loops in a hot fill process.

In accordance with a first aspect, a system is provided comprising a chamber wherein a base concentrate common to at least a first flavored food product and a second flavored food product is formed, the first flavored food product having different flavoring than the second flavored food product, the base concentrate having a first temperature. The system can comprise a process line comprising at least one stir tank that receives the base concentrate from the chamber and flavoring from either a first flavor source corresponding to the first flavored food product or a second flavor source corresponding to the second flavored food product. The at least one stir tank can also receive heated liquid that, when combined with the base concentrate and flavoring, raises the temperature of the mixture to a second temperature. If desired, the system can hold the mixture at the second temperature for a time period sufficient to achieve a desired microbial, chemical, biochemical, and/or enzymatic change in the mixture. The system can comprise a heat exchanger that receives the effluent stream of the mixture of the at least one stir tank having the second temperature, and cools the effluent stream to a third temperature, the second temperature greater than the third temperature.

In accordance with a second aspect of the invention, a method is provided comprising: forming a base concentrate common to at least a first flavored food product and a second flavored food product, the first flavored food product having different flavoring than the second flavored food product, the base concentrate having a first temperature; adding to the base concentrate flavoring corresponding to the first flavored food product and a heated liquid to form a heated non-concentrate of the first flavored food product having a second temperature, the second temperature greater than the first temperature; and cooling the heated non-concentrate of the first flavored food product to a third temperature, the second temperature greater than the third temperature. The heated non-concentrate of the first flavored food product, if desired, can be held at the second temperature for a time period sufficient to achieve desired chemical, microbial, biochemical and/or enzymatic change before cooling the heated non-concentrate to the third temperature.

In accordance with a third aspect of the invention, a method is provided comprising: (1) forming of a base concentrate, the base concentrate common to at least a first flavored food product and a second flavored food product, the first flavored food product having different flavoring than the second flavored food product, the base concentrate having a first temperature; (2) adding to the base concentrate flavoring corresponding to the first flavored food product and a heated liquid to form a heated non-concentrate of the first flavored food product having a second temperature, the second temperature greater than the first temperature; (3) cooling the heated non-concentrate to a third temperature, the second temperature greater than the third temperature; and (4) changing step (2) from the adding of flavoring corresponding to the first flavored food product to the adding of flavoring corresponding to the second flavored food product to form a heated non-concentrate of the second flavored food product. The heated non-concentrate of flavored food product formed in step (2), if desired, can be held at the second temperature for a time period sufficient to achieve desired chemical, microbial, biochemical and/or enzymatic change before cooling the heated non-concentrate to the third temperature.

It will be appreciated by those skilled in the art that the system and methods disclosed here can be particularly suitable for the forming, heating, holding and cooling of beverages in a production line. Those skilled in the art will appreciate that the system and methods disclosed here can be particularly suitable for the forming, heating, holding and cooling of a first flavored beverage in a production line, and changing to the forming, heating, holding and cooling of a second flavored beverage using the same production line.

These and other aspects, features and advantages of the invention or of certain embodiments of the invention will be further understood by those skilled in the art from the following description of exemplary embodiments.

BRIEF DESCRIPTION OF THE DRAWINGS

FIG. 2 comprises FIGS. 2A and 2B.

DETAILED DESCRIPTION OF THE INVENTION

Those of ordinary skill in the art will understand that the methods and systems disclosed here can be used to heat any heated food product(s). Such food product can be a beverage. Such beverages can include, e.g. ready to drink liquid formulations (including formulations that are to be later frozen), beverage concentrates and the like. Such beverages can include, e.g., carbonated and non-carbonated soft drinks, fountain beverages, coffee beverages, tea beverages, dairy beverages, powdered soft drinks, as well as liquid concentrates, flavored waters, enhanced waters, fruit juice and fruit juice-flavored drinks, sport drinks, and alcoholic products. Containers for the food product can be any suitable container, including but not limited to bottles and cans. Containers for the food product can comprise any suitable material including but not limited to glass, polyethylene terephthalate (PET), and aluminum.

In one embodiment, the heater heats the food product to a temperature sufficient to reduce microbial load in the food product.

The system or apparatus can comprise a filling station where the heated food product is placed into containers upstream of a container cooler.

Figure 2B:
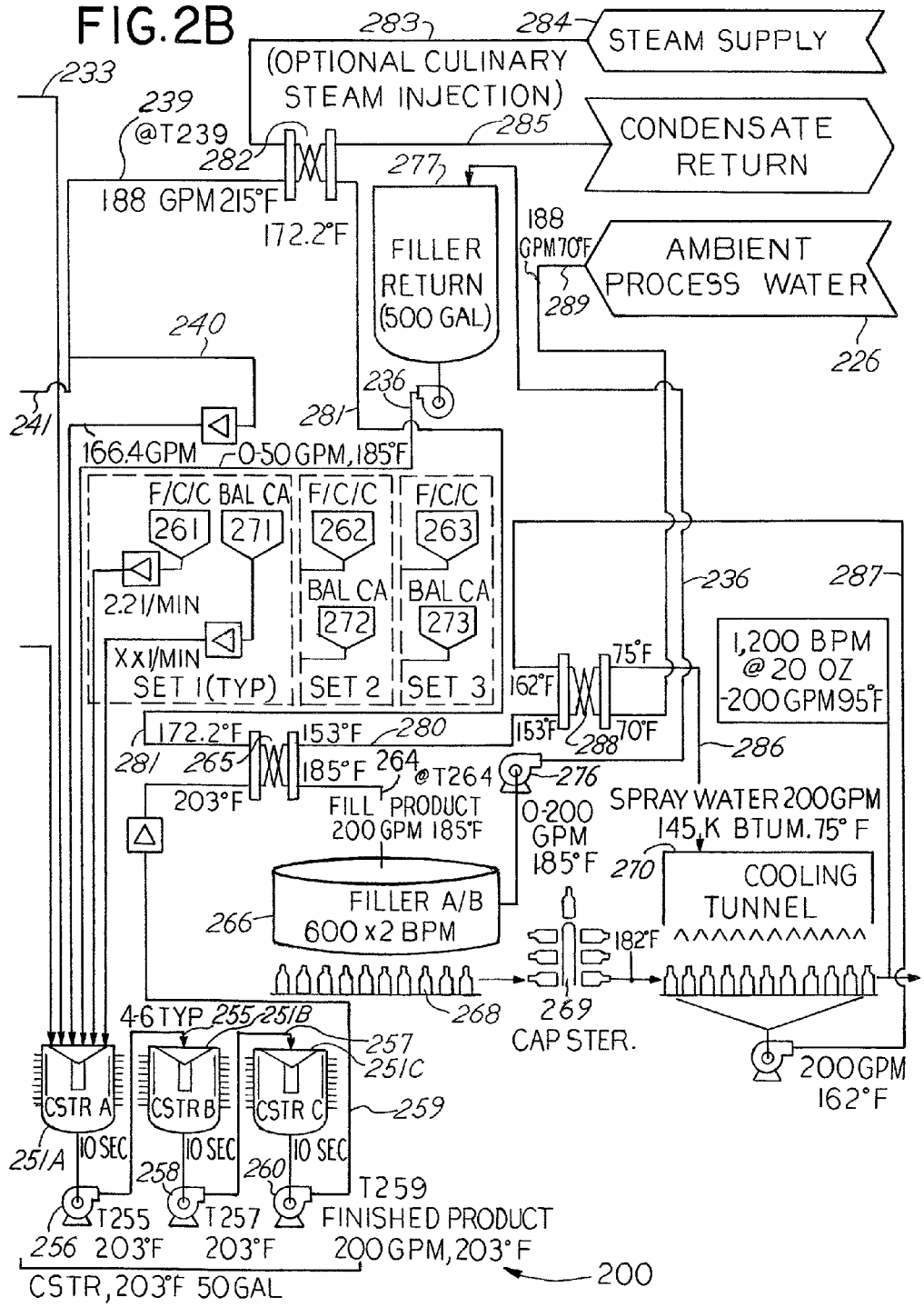
FIG. 2 is a block diagram illustrating an embodiment of the present invention.

An exemplary embodiment in accordance with the present invention is depicted as system 200 in FIG. 2. As shown in system 200, a concentrate 230 of ingredients common to at least two different flavored beverages can be prepared in a chamber or base mix tank 202. Base mix tank 202 can have a capacity of about 400 gallons. As shown in FIG. 2, base mix tank 202 can receive the following ingredients from the following sources in any desired combination: Process water 204 (e.g., ambient process water) from process water source 206, citric acid 208 (e.g., bulk citric acid) from citric acid source 210, common ingredient blend 212 (e.g., salt blend) from common ingredient blend source 214, sucrose 216 (e.g., liquid sucrose) from sucrose source 218, fructose 220 (e.g., high fructose corn syrup ("HFCS")) from fructose source 222, and heated and treated, if desired, water 224 (e.g., ambient water from source 226) that is heated to a desired temperature T228 prior to entering base mix tank 202. Some or all of the ingredients added to base mix tank 202 may be preheated to achieve a desired temperature for stream 230 exiting tank 202.

As shown in FIG. 2, heated water 224 can be provided by streams 241, 242, 243, and 244, which are respectively associated with process lines L1, L2, L3, and L4. The details relating to the heating of water for line L1 is shown in FIG. 2, and can be the same as for process lines L2, L3 and L4 (the details for which are not shown). Thus, a single base mix tank 202 can be used for supplying concentrate 230 to more than one process line.

Concentrate 230 can exit base mix tank 202 and be pumped by pump 232 along lines L1, L2, L3 and L4. Some or a portion of concentrate 230 can be sent back to base mix tank 202 if desired. Line L1 can be fed to continuous stirred tank reactor ("CSTR") 251A. Ingredients for a first flavored beverage can be fed to CSTR 251A from ingredient sources 261 and 271 (shown collectively "Set 1" in FIG. 2). Additional components can be added to CSTR 251A, such as hot water 233 from hot water source 234, stream 240, and filler return stream 236. Hot water 233 can be used for flushing when desired (e.g., when it is desired to change from formulating a first flavored food product to formulating a second flavored food product.

The ingredients mixed in CSTR 251A can have an appropriate resident time (e.g., about 10 seconds) and temperature, and can exit as mixture 255. Mixture 255 can exit CSTR 251A and be pumped via pump 256 to CSTR 251B. Mixture 255 can be further mixed in CSTR 251B and have an appropriate resident time (e.g., about 10 seconds) therein, and exit as mixture 257. Mixture 257 can exit CSTR 251B and be pumped via pump 258 to CSTR 251C. Mixture 257 can be further mixed in CSTR 251C and have an appropriate resident time (e.g., about 10 seconds) therein, and exit as mixture 259. Mixtures 255, 257 and 259 can have a temperature(s) T255, T257, and T259 respectively, e.g., about 203° F., sufficient to reduce microbial load in these mixtures. In other words, the resident time and temperature of the mixtures within CSTR 251A, 251B, and 251C can be sufficient to achieve reduce microbes within the mixtures. In addition or alternatively, the resident time and temperature of the mixtures within CSTR 251A, 251B, and 251C can be sufficient to achieve a desired chemical, biochemical, and/or enzymatic change within the mixtures.

Mixture 259 can exit CSTR 251C and be pumped via pump 260 to trim cooler 265. Pumps 256, 258, and 260 can have about the same pumping capacity, e.g., about 200 gallons per minute. At trim cooler 265, mixture 259 can be cooled, and exit as fill product 264 having a temperature T264 (e.g., about 185° F.). Fill product 264 can be sent to a filler apparatus or filling station 266, where it can be placed in containers 268. Filling station 266 can comprise two or more filling lines (e.g., parallel filling lines A and B of filling station 266 identified in FIG. 2). Containers 268 can then be capped by a capping apparatus or capster 269. Containers 268 can be inverted so the final product can heat the inside of the containers and caps and reduce the microbial load thereon. In other words, T264 of fill product 264 can be sufficient to reduce microbes on the inside of the containers and caps. Filled containers 268 can then be sent to a cooling tunnel or container cooler 270, where the containers are cooled to a desired temperature (e.g., a temperature that permits the affixing of labels to the containers, such as about 95° F.).

A return of excess fluid from filling station 266 can be sent as stream 236 via pump 276 to filler return tank 277.

Coolant 280 having a temperature T280 (e.g., about 153° F.) can enter trim cooler 265 and exit as stream 281 having a temperature T281 (e.g., about 172.2° F.). Stream 281 can be sent to heat exchanger 282 and exit as stream 239 having a temperature T239 (e.g., about 215° F.). At heat exchanger 282, stream 281 can be heated by steam 283 from steam supply source 284. Stream 239 can be split into streams 240 and 241. Stream 240 can be added to CSTR 251A as desired. Steam 283 can exit heat exchanger 282 as condensate return 285.

Spray water 286 having a temperature T286 (e.g., about 75° F.) can enter container cooler 270, and exit as stream 287 having a temperature T287 (e.g., about 162° F.). Stream 287 can be sent to heat exchanger 288, and exit as stream 286 having temperature T286, and stream 286 can be used again in container cooler 270 as shown in FIG. 2.

Process water 289 having a temperature T289 (e.g., about 70° F.) from process water source 226 can enter heat exchanger 288 and exit as stream 280, where it can be sent to trim cooler 265 as described above. Water quality can differ at each point of use, i.e., heat exchangers, CSTRs, etc. and can be controlled by suitable water treatment systems (not shown) prior to point of use.

The above description of equipment in connection with line L1 is similarly applicable to lines L2, L3, and L4. One or more than one line can be used as desired.

When it is desired to change flavoring from Set 1 to Set 2, then valves for the ingredients from Set 1 can be closed, and the relatively small amount of food product from Set 1 up to the filling station 266 can be purged from the system. For example, for a flavor change, only part of the system 200, approximately 200 gallons, staring from blending at CSTR 251A to filler discharge has to be purged or emptied and flushed with hot water 233. This is followed with a new flavor product from Set 2, which achieves thermal steady state rapidly in CSTR 251A, and there is no water commingled stream that has to be discarded. Thus, the amount of food product that needs to be purged is much less than the thousands of gallons that needs to be purged in a conventional system like that shown in FIG. 1. The system shown in FIG. 2 can be used to change flavoring back from Set 2 to Set 1. The system show in FIG. 3 can be used to change flavoring from Set 1 or Set 2 to Set 3. Those skilled in the art will recognize that the F/C/C designation in FIG. 2 means flavor color cloud. The system shown in FIG. 2 can be used for much faster "flavor" changeovers. The system shown in FIG. 2 can be used for flavor customization at specific lines. The system shown in FIG. 2 provides for the preparing of "concentrate" of common formula ingredients across multiple flavors and lines.

The use of CSTRs in accordance with the above description reduces or eliminates the need for product hold loops in conventional systems for achieving equivalent thermal treatment. Alternatively, a "hold loop" as used in conventional practice can be used instead of or in addition to this bank of CSTRs if desired. Those of skill in the art will recognize that an aspect of the present invention can include a "holding" of the heated liquids of flavored food products for a time period sufficient to achieve desired chemical, microbial, biochemical, and/or enzymatic change in thereof, and then cooling the heated flavored food products to a second temperature.

As described above, by using continuous blending of common formula ingredients (except those needed to customize a particular flavor, with partial quantity of heated formula water at an elevated temperature (e.g., 215° F.) to prepare a concentrate blend at a greater than ambient temperature (e.g., greater than about 90° F., such as about 151° F.)), a concentrate can be prepared and supplied to multiple lines, thereby eliminating the need for "batch preparation" for each line.

The concentrate or concentrated blend can be mixed with remaining formula water, and those remaining formula ingredients required to customize a particular flavor, in a range of 1:5 to 1:9, concentrate:water, by volume. The temperatures of these streams can be arranged so as to achieve a blend temperature of 195 to 203° F. plus or minus 3° F., or as required for thermal treatment. This can be accomplished in CSTR 251A.

Water at an ambient temperature (e.g., water supplied from a city water supply) and pre-treated, can be pre-heated at heat exchanger 288 by heat that has been rejected by final product in containers (e.g., bottles) in a down stream container cooler 270, and further heated by thermally treated fluid being cooled from thermal treatment temperature down to fill temperatures in cooler 265.

Continuous stirred tank reactors in series can be used to achieve continuous thermal treatment of a food product. This thermal treatment can reduce an undesirable reaction in the food product selected from the group consisting of chemical reaction, biochemical reaction, enzymatic reaction, and microbial reaction, and any combination thereof. In one embodiment, the undesirable reaction that is reduced with continuous thermal treatment is microbial reaction or microbial load in the food product.

In one embodiment, a temperature of about 203° F., plus or minus 3° F., is achieved upon the blending of hot water with pre-treated concentrate in CSTR 251A, and this temperature is maintained for about 30-33 seconds in a series of CSTRs under turbulent flow conditions. This can then be followed by cooling to about 185° F., plus or minus 3° F. in a trim cooler with formula water pre-heated with heat that had been rejected at the container cooler, and maintaining a surge of this thermally treated blend, followed by filling containers, and thermally treating the inside surface of pre-rinsed containers (e.g., PET or glass bottles) with this hot-fluid, hence named "hot-fill" process, and filling bottles of suitable sizes, and applying a cap to the containers, and inverting the filled and capped containers for thermal treatment of the caps. This can then be followed by cooling of the contents of the filled containers from about 182° F. to below 100° F. with a closed loop recirculation of utility water, wherein heat rejected by the container contents is gained by this utility water. This can be followed with cooling of the utility water for re-use in re-circulation with water initially at ambient temperature, supplied by city supply and pre-treated to pick up this heat rejected by product in containers in the container cooler. Also can be provided is a return of excess fluid at a temperature of about 185° F., plus or minus 3° F., at the filler to surge tank, typically called a filler return tank. Also can be provided is a recycling of the excess fluid back to the first CSTR, i.e., CSTR 251A. Also can be provided is a sending of filled, capped and dried bottles to a downstream operation of labeling.

The improvements provided in the system shown in FIG. 2 include reduced capital equipment requirements. More specifically, in an embodiment shown in FIG. 2, a single, smaller concentrate blend system common for multiple lines can be used, as opposed to one larger blend system per line in a conventional system, such as that shown in FIG. 1. Also more than one filling station per line can be used to achieve a higher rate of throughput in accordance with the present invention, wherein a conventional system is limited to one filling station per line. The system shown in FIG. 2 also eliminates two batch blend surge tanks of thousands of gallons, such as 8,000 to 10,000 gallons each, that are needed in a conventional system, such as that shown in FIG. 1, and corresponding pumps and valve matrix, and balance tank. This in turn can result in reduced floor space requirements in both the process area and the utility area. The system shown in FIG. 2 can also be used to reduce labor costs because one operator can readily monitor more than one line in FIG. 2 practically as easy as the one line shown in a conventional system shown in FIG. 1.

The system shown in FIG. 2 can result in reduced loss of product because the smaller equipment can result in lower waste upon change over to another flavor, start up and shut down. The system shown in FIG. 2 does not incur losses of residual product sent to the drain from batch blend surge tanks, balance tank and heater loop for achieving thermal treatment temperature because these components, which are required in a conventional system shown in FIG. 1, are not needed in the system shown in FIG. 2.

The system shown in FIG. 2, can provide increased production flexibility. More specifically, the system shown in FIG. 2 has the capability to continuously vary production rate (e.g., number of filled containers/minute) and size of containers being filled, whereas the system shown in FIG. 1, which is limited to a specific production rate for a specific sized container. There is also no need to change hold tubes when changing container size for the system shown in FIG. 2, which is required for the conventional system shown in FIG. 1 (e.g., when going from 12 ounce to 20 ounce of product per container). As previously discussed, the system shown in FIG. 2 can provide for a reduced time for flavor changes to be made over the time needed to make flavor changes in a conventional system.

Figure 1:
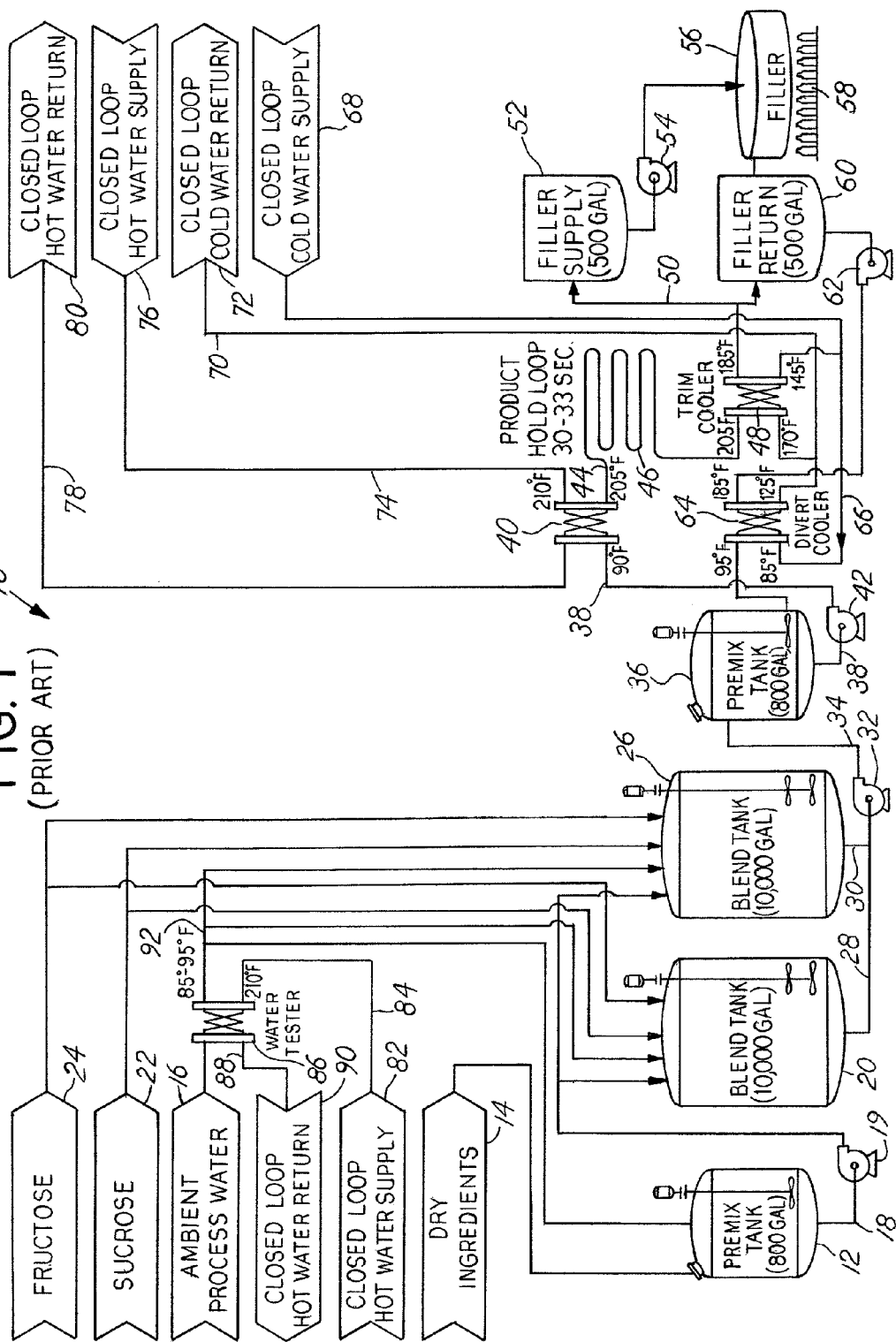
FIG. 1 is a block diagram illustrating a conventional system that includes the blend tanks and a hold product loop in connection with a hot fill process for a beverage.

The system shown in FIG. 2 also provides improved sustainability over the system shown in FIG. 1 due to reduced utilities consumptions, e.g., in the amount of steam used for thermal treatment of product due to incorporation of regeneration loops, and reduced electrical power consumption. The system shown in FIG. 2 also provides improved sustainability over the system shown in FIG. 1 due to reduced water consumption, e.g., elimination of the use of a cooling tower loop for rejecting heat from filled containers in a container cooler, and reduced water consumption for cleaning in place ("CIP") equipment (e.g., accessories, pumps, valves and flow lines), such as may be needed to switch from on product formulation to another product formulation to be made using the equipment.

EMBODIMENTS

In Embodiment 1, a system or apparatus is provided comprising a chamber wherein a base concentrate common to at least a first flavored food product and a second flavored food product is formed, the first flavored food product having different flavoring than the second flavored food product, the base concentrate having a first temperature. The chamber can be any suitable structure wherein a base concentrate can be formed, including but not limited to a tank (e.g., a base mix tank), a vessel, a nozzle, and/or a pipe. The apparatus can comprise a process line comprising at least one stir tank that receives the base concentrate from the chamber and flavoring from either a first flavor source corresponding to the first flavored food product or a second flavor source corresponding to the second flavored food product. The at least one stir tank can also receive heated liquid that, when combined with the base concentrate and flavoring forms a mixture, the mixture having a second temperature that is greater than the first temperature of the base concentrate. The second temperature of the mixture can be sufficient to achieve a change in the mixture selected from the group consisting of microbial change, chemical change, biochemical change, and enzymatic change or combinations thereof.

Embodiment 2

Same as Embodiment 1, wherein the food product can be a beverage.

Embodiment 3

Same as Embodiments 1 or 2, wherein the system can comprise at least one valve at the first flavor source having an open position when the first flavor source is to be received by the process line and a closed position when not, at least one valve at the second flavor source having an open position when the second flavor source is to be received by the process line and a closed position when not.

Embodiment 4

Same as any of the preceding embodiments, wherein the system can comprise a heated water source provides heated water to the chamber.

Embodiment 5

Same as any of the preceding embodiments, wherein the heated water source can provide heated water to the at least one stir tank.

Embodiment 6

Same as any of the preceding embodiments, wherein the at least one stir tank is a continuous stirred tank reactor.

Embodiment 7

Same as any of the preceding embodiments, wherein the process line comprises at least two stir tanks in series.

Embodiment 8

Same as any of the preceding embodiments, wherein the at least two stir tanks are continuous stirred tank reactors.

Embodiment 9

Same as any of the preceding embodiments, wherein the process line comprises at least three or more stir tanks in series.

Embodiment 10

Same as any of the preceding embodiments, wherein the at least three or more stir tanks are continuous stirred tank reactors.

Embodiment 11

Same as any of the preceding embodiments, wherein the change in the mixture is a reduction in microbes in the mixture.

Embodiment 12

Same as any of the preceding embodiments, wherein the wherein the mixture is held within the process line at the second temperature for a sufficient period of time to reduce microbes in the mixture to a desired level.

Embodiment 13

Same as any of the preceding embodiments, further comprising a heat exchanger wherein mixture is cooled from the second temperature to a third temperature. For example, the apparatus can comprise a heat exchanger that receives an effluent stream of the mixture of the at least one stir tank having the second temperature and cools the effluent stream to a third temperature.

Embodiment 14

Same as any of the preceding embodiments, wherein the third temperature is sufficiently high to reduce microbes on an inside surface of a container structure, for example, the inside surface of a bottle and/or cap when the mixture contacts the inside surface. This contact between the mixture and the inside surface of the container can be facilitated by filling the bottle with the mixture, capping the bottle with a cap, and then turning the capped bottle in a manner so that the mixture moves within container to come into contact with all inside surfaces of the container (i.e., the inside surfaces of the bottle and cap).

Embodiment 15

Same as any of the preceding embodiments, further comprising a filling station that receives the effluent stream from the heat exchanger and wherein containers are filled with the effluent stream.

Embodiment 16

Same as any of the preceding embodiments, further comprising a container cooler that receives filled containers from the filling station and cools the containers to a fourth temperature.

Embodiment 17

Same as any of the preceding embodiments, wherein the fourth temperature is sufficiently low to allow for a label to be affixed to an outside surface of the container structure.

Embodiment 18

A method comprising: forming a base concentrate common to at least a first flavored food product and a second flavored food product, the first flavored food product having different flavoring than the second flavored food product; adding to the base concentrate flavoring corresponding to the first flavored food product and a heated liquid to form a mixture, the mixture having a second temperature that is higher than the first temperature of the base concentrate, the second temperature sufficient to achieve a change in the mixture selected from the group consisting of microbial change, chemical change, biochemical change, and enzymatic change, and combinations thereof.

Embodiment 19

Same as Embodiment 18, wherein the change in the mixture is a reduction in microbes in the mixture.

Embodiment 20

Same as any of the preceding embodiments, further comprising holding the mixture at the second temperature for a sufficient period of time to reduce microbes in the mixture to a desired level.

Embodiment 21

Same as any of the preceding embodiments, further comprising cooling the mixture from the second temperature to a third temperature.

Embodiment 22

Same as any of the preceding embodiments, wherein the third temperature is sufficiently high to reduce microbes on an inside surface of a container structure when the mixture contacts the inside surface of the container structure.

Embodiment 23

Same as any of the preceding embodiments, further comprising filling containers with the mixture when the mixture is at the third temperature.

Embodiment 24

Same as any of the preceding embodiments, further comprising cooling the containers until an outside surface of a container reaches a fourth temperature, the fourth temperature sufficiently low to allow for affixing of a label to the outside surface of the container.

Embodiment 25

Same as any of the preceding embodiments, further comprising affixing a label to the outside surface of a container filled with the mixture.

Embodiment 26

Same as any of the preceding embodiments, further comprising the step of substituting the flavoring corresponding to the first flavored food product with the flavoring corresponding to the second flavored food product.

Embodiment 27

A method comprising: (1) forming of a base concentrate, the base concentrate common to at least a first flavored food product and a second flavored food product, the first flavored food product having different flavoring than the second flavored food product, the base concentrate having a first temperature; (2) adding to the base concentrate flavoring corresponding to the first flavored food product and a heated liquid to form a first mixture, the first mixture having a second temperature that is higher than the first temperature of the base concentrate, the second temperature sufficient to achieve a change in the first mixture selected from the group consisting of microbial change, chemical change, biochemical change, and enzymatic change, and combinations thereof; (3) cooling the first mixture from the second temperature to a third temperature; and (4) changing step (2) from the adding of flavoring corresponding to the first flavored food product with the adding of flavoring corresponding to the second flavored food product to form a second mixture, the second mixture having a temperature that is higher than the first temperature of the base concentrate and is sufficient to achieve a change in the second mixture selected from the group consisting of microbial change, chemical change, biochemical change, and enzymatic change, and combinations thereof. Prior to step (4), the first mixture can be placed into containers and cooled as previously described. After step (4), i.e., making the change over from making a first mixture corresponding to the first flavored food product to the second mixture corresponding to the second flavored food product, the second mixture can be placed into containers and cooled as previously described.

Those skilled in the art will recognize that the flow rates, such as gallons per minute (GPM) or bottles per minute (BPM), or temperatures shown in the figures are exemplary. Given the benefits of the above disclosure and description of exemplary embodiments, it will be apparent to those skilled in the art that numerous alternative and different embodiments are possible in keeping with the general principles of the invention disclosed here. Those skilled in this art will recognize that all such various modifications and alternative embodiments are within the true scope and spirit of the invention. The appended claims are intended to cover all such modifications and alternative embodiments. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. An apparatus comprising:
a chamber configured to receive ingredients to form a base concentrate, the base concentrate common to at least a first flavored food product and a second flavored food product, the first flavored food product having different flavoring than the second flavored food product, the base concentrate having a first temperature, the base concentrate devoid of flavoring corresponding to the first flavored food product or the second flavored food product,
a first flavor source corresponding to the first flavored food product, the first flavor source downstream of the chamber,
a second flavor source corresponding to the second flavored food product, the second flavor source downstream of the chamber,
a plurality of process lines downstream of the chamber, each process line configured to receive the base concentrate from the chamber, heated liquid from a heated liquid source, and flavoring to form a mixture of base concentrate, heated liquid and flavoring, wherein the flavoring received by at least one process line comprises flavoring from either the first flavor source corresponding to the first flavored food product or the second flavor source corresponding to the second flavored food product, each process line comprising at least one stir tank, wherein the mixture exiting the at least one stir tank of each process line has a second temperature, the second temperature greater than the first temperature of the base concentrate, the second temperature sufficient to achieve a change in the mixture selected from the group consisting of microbial change, chemical change, biochemical change, and enzymatic change, and combinations thereof,
a valve associated with the first flavor source and having an open position when the first flavor source is to be received by the at least one process line and a closed position when not, and
a valve associated with the second flavor source and having an open position when the second flavor source is to be received by the at least one process line and a closed position when not.

2. The apparatus of claim 1, wherein the first food product is a beverage.

3. The apparatus of claim 1, wherein the apparatus comprises a heated water source that provides heated water to the chamber.

4. The apparatus of claim 1, wherein the heated water source provides heated water to the at least one stir tank.

5. The apparatus of claim 1, wherein the at least one stir tank is a continuous stirred tank reactor.

6. The apparatus of claim 1, wherein the process line comprises at least two stir tanks in series.

7. The apparatus of claim 6, wherein the at least two stir tanks are continuous stirred tank reactors.

8. The apparatus of claim 6, wherein the process line comprises at least three or more stir tanks in series.

9. The apparatus of claim 8, wherein the at least three or more stir tanks are continuous stirred tank reactors.

10. The apparatus of claim 1, wherein the change in the mixture is a reduction in microbes in the mixture.

11. The apparatus of claim 1, wherein the mixture is held within the process line at the second temperature for a sufficient period of time to reduce microbes in the mixture to a desired level.

12. The apparatus of claim 1, further comprising a heat exchanger wherein the mixture is cooled from the second temperature to a third temperature and then exits the heat exchanger.

13. The apparatus of claim 12, wherein the third temperature is sufficiently high to reduce microbes on an inside surface of a container structure when the mixture contacts the inside surface of the container structure.

14. The apparatus of claim 13, further comprising a filling station that receives the mixture that exits the heat exchanger and wherein containers are filled with the mixture that exits the heat exchanger.

15. The apparatus of claim 14, further comprising a container cooler that receives filled containers from the filling station and cools the containers to a fourth temperature.

16. The apparatus of claim 15, wherein the fourth temperature is sufficiently low to allow for labeling to be affixed to an outside surface of the container structure.

17. The apparatus of claim 1, wherein the base concentrate is common to at least a third flavored food product and a fourth flavored food product, the third flavored food product having different flavoring than the fourth flavored food product, the base concentrate devoid of flavoring corresponding to the third flavored food product or the fourth flavored food product, wherein the at least one process line is a first process line and the plurality of process lines comprises a second process line, the first process line and the second process line in a parallel configuration, wherein the flavoring received by the second process line comprises flavoring from either a third flavor source or a fourth flavor source, the third flavor source corresponding to the third flavored food product, the fourth flavor source corresponding to the fourth flavored food product, and the apparatus further comprising a valve associated with the third flavor source and having an open position when the third flavor source is to be received by the second process line and a closed position when not, and a valve associated with the fourth flavor source and having an open position when the fourth source is to be received by the second process line and a closed position when not.

18. The apparatus of claim 17, wherein the third flavor source has the same flavoring as the first flavor source, and the third flavored food product is the same as the first flavored food product.

19. The apparatus of claim 18, wherein the fourth flavor source has the same flavoring as the second flavor source, and the fourth flavored food product is the same as the second flavored food product.

20. The apparatus of claim 17, wherein the third flavor source has different flavoring from the first flavor source, and the third flavored food product is different from the first flavored food product.

21. The apparatus of claim 20, wherein the fourth flavor source has different flavoring from the second flavor source, and the fourth flavored food product is different from the second flavored food product.

* * * * *